C. T. MASON.
TELEPHONE TRANSMITTER.
APPLICATION FILED APR. 27, 1908.
917,633.
Patented Apr. 6, 1909.
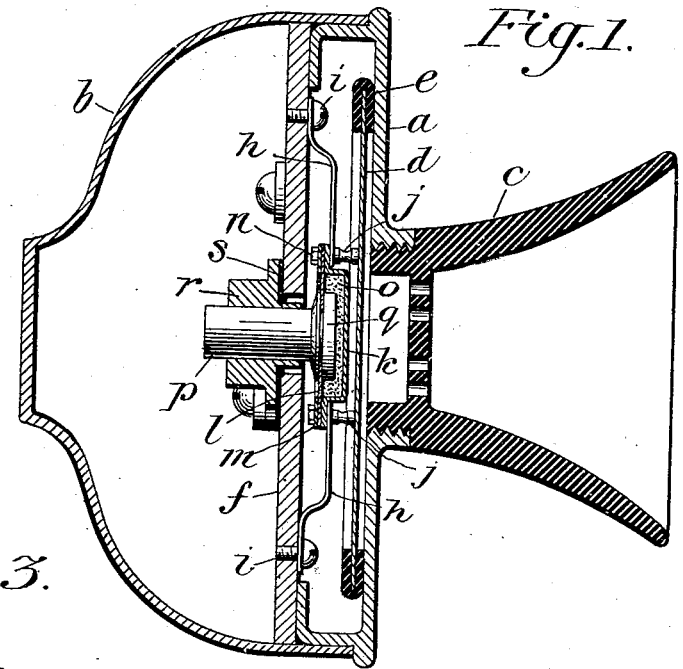
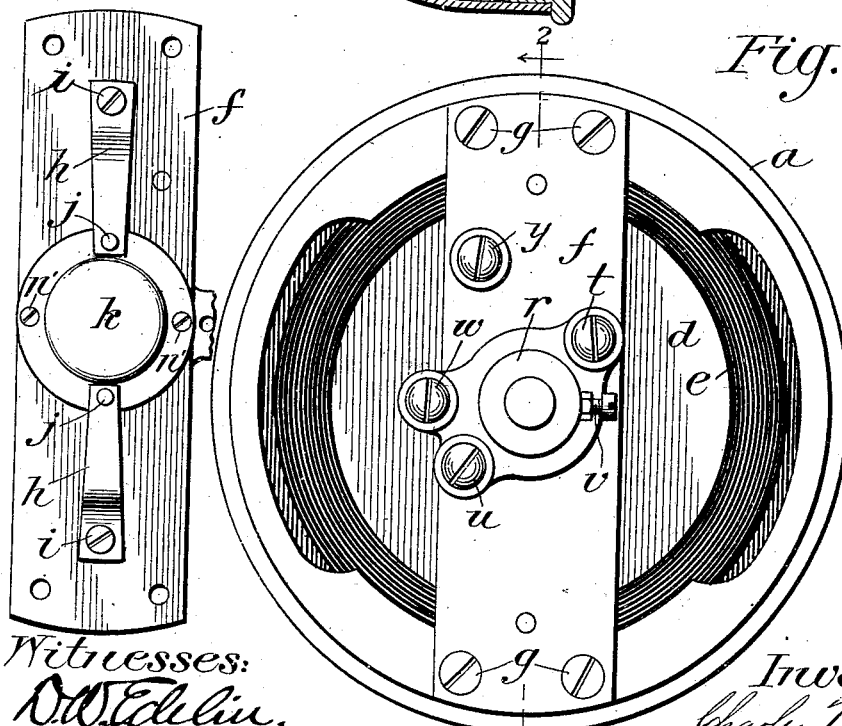

UNITED STATES PATENT OFFICE.

CHARLES T. MASON, OF SUMTER, SOUTH CAROLINA, ASSIGNOR TO THE SUMTER TELEPHONE MFG. CO., OF SUMTER, SOUTH CAROLINA, A CORPORATION OF SOUTH CAROLINA.

TELEPHONE-TRANSMITTER.

No. 917,633.  Specification of Letters Patent.  Patented April 6, 1909.

Application filed April 27, 1908. Serial No. 429,385.

*To all whom it may concern:*

Be it known that I, CHARLES T. MASON, a citizen of the United States, residing at Sumter, county of Sumter, State of South Carolina, have invented certain new and useful Improvements in Telephone-Transmitters; and I do hereby declare the following to be a full, clear, and exact description of the invention, such as will enable others skilled in the art to which it appertains to make and use the same.

The object of the invention is to provide an improved telephone transmitter of materially simplified construction and increased efficiency of operation, involving a sound receiving diaphragm, a variable resistance medium supported independently of the diaphragm and preferably by resilient means to permit the same to take up the vibrations of the diaphragm, and means for transmitting the vibrations of the diaphragm to the variable resistance medium, which means coöperate with the diaphragm at points outside the center thereof. The several parts are so relatively arranged that the sound receiving diaphragm may be readily removed and a new diaphragm placed in position without changing the adjustment of any of the other vital parts of the apparatus; the other parts of the instrument may be readily changed or adjusted; the construction and arrangement of the cell containing the variable resistance medium is such that packing of the granular material is obviated and the assembling and mounting of the cell and its appurtenant parts may be readily effected without changing the adjustment or impairing the comparatively delicate parts thereof; the cell containing the variable resistance medium is so related to its support and the diaphragm that said cell and medium is held under tension or stress and is therefore more susceptible to vibrations from the sound receiving diaphragm; and the sound receiving diaphragm itself possessing greater active power at points located between the center and the periphery thereof being connected with the flexibly supported cell containing the variable resistance, by means engaging the diaphragm at such points, an instrument possessing superior transmitting qualities is produced.

In the accompanying drawings, Figure 1 is a vertical longitudinal section through a transmitter embodying a simplified form of the invention. Fig. 2 is a rear view of the transmitter with the casing removed. Fig. 3 is a front view of the bridge piece upon which the cell containing the variable resistance medium is mounted.

Referring to the drawings, $a$ indicates the front plate of the transmitter shell $b$, with which is associated the usual mouth-piece $c$. Back of the mouth-piece and resting loosely against the rear wall of the face plate $a$ is a diaphragm $d$ provided at its periphery with the resilient packing $e$. The diaphragm as thus applied has no permanent connection with any of the parts of the apparatus, but is loosely supported at its periphery within the casing and may be removed at will without disturbing the adjustment of the other parts, as will be explained hereinafter.

Attached to the flange of the face plate $a$, at diametrically opposite points is a bridge piece $f$, which is secured in position by screws $g$ or any other suitable fastenings to admit of said bridge piece being readily removed. Secured to said bridge piece by means of screws $i$ are two spring members $h$ of the form indicated, which extend toward the middle of the bridge piece and are attached at their outer ends to the peripheral edge of a generally plate-shaped cell $k$, which is adapted to contain the variable resistance medium $o$ which may be in the form of the usual granular material employed in telephone transmitters. The rear wall of said cell is conveniently formed by a disk of mica or similar material perforated at its center and attached to the peripheral edge of the cell by means of an annular washer $m$, all of the parts, including the resilient spring supports $h$ being secured together by the screw threaded ends of two posts or pins $j$, which pass through registering openings in the ends of spring $h$, the peripheral edges of cell $k$, mica disk $l$ and washer $m$ and are held in position and serve to hold the other parts together by nuts $n$. The pins $j$ engage the diaphragm $d$ at points eccentric thereto and serve to transmit the vibrations of the diaphragm to the cell containing the variable resistance medium, because of its flexible mounting on the bridge $f$. The said bridge $f$ is provided with a central orifice, through which projects a stationary but adjustable electrode which is adapted to engage the mica disk $l$ and coöperate with the cell containing the granular material, first to form the stationary electrode with which the granular material coöperates, and second, to serve as means for adjusting the position of the containing cell with respect to its supporting bridge $f$ and the diaphragm $d$ so that said cell is retained under tension or stress and the ends of pins $j$ are held firmly in engagement with the diaphragm $d$.

The stationary electrode may conveniently take the form illustrated in the drawings, comprising a pin-like element $p$ provided with a flanged head which rests against the outside of the mica diaphragm $l$ and is held in contact therewith by means of a screw $q$ which engages a suitable hole in the end of the element $p$, as clearly shown in Fig. 1. The stem of electrode $p$ is supported in a collar piece $r$ which is attached to but insulated from the bridge piece $f$, the insulating medium being indicated at $s$ and the securing means represented by screws $t$ and $u$. The stem of the electrode $p$ is adapted to be adjusted in the collar $r$ to regulate the amount of tension on the resiliently supported cell $k$ and correspondingly the degree of contact pressure between pins $j$ and diaphragm $d$, and said electrode $p$ is held in its adjusted position by means of a set screw $v$.

It will be understood, of course, that any desired or convenient mode of connecting the circuits may be adopted, provided that the arrangement is such as to include in the circuit the granular material which forms the variable resistance medium. A convenient form of circuit connection is that indicated in the drawings, in which $y$ indicates a connecting screw or binding post attached to the bridge piece $f$ and $w$ a similar connecting means on the collar $r$, so that the circuit will be established from $y$ through bridge piece $f$, connecting springs $h$, the metal frame of cell $k$, which forms one electrode, through the granular material, thence to stationary electrode $q$ and stem $p$ thereof, to collar $r$ and binding post $w$.

It will be noted that by adjusting the stationary electrode stem $p$ in the collar $r$, the tension or stress maintained on the resiliently supported cell $k$ and consequently the contact pressure between pins $j$ and diaphragm $d$ may be varied to obtain the best results, and once this adjustment has been obtained, the apparatus may be taken apart, the bridge piece with its appurtenant parts removed bodily and the diaphragm itself taken out and, if necessary, renewed or replaced, after which the apparatus may be reassembled without requiring readjustment.

By referring to the foregoing description, it will be observed that the operation of the apparatus is as follows: When the sound vibrations impinge the diaphragm $d$, the latter is set in vibration, which as explained is of greater force or amplitude at points beyond the center of said diaphragm and these amplified vibrations are transmitted to pins $j, j$ unequally, so that the points or ends of said pins have an oscillatory motion, which motion is, in turn, conveyed to the cell $k$ containing the granular material $o$, said cell containing or constituting the front electrode. The entire cell, together with its supporting springs $h$ being under tension or strain is peculiarly susceptible to the delicate vibrations received from the pins $j\ j$ and said cell is caused to approach and recede from the rear or stationary electrode $q$, thereby subjecting the variable resistance medium or granular material $o$ to a continual increase and decrease of pressure which causes a consequent variation in the electrical resistance thereof.

It will be further observed that the motion imparted to the cell $k$ is irregular in character owing to the pins $j, j$, which are located out of center of the vibrating diaphragm $d$ and also out of center with respect to said cell, therefore the vibration transmitted from the main diaphragm, instead of being uniform as in the case of transmitters actuated by a single connection in the center of the main diaphragm, is irregular and uneven, and the consequent variation in the pressure on the granular material is much greater and the power of the instrument correspondingly increased.

While the invention has been described in connection with the particular form of instrument shown in the drawings, it will be understood that said details are susceptible of various changes and modifications, without departing from the spirit of the invention, which is regarded as generic in its character.

Aside from the particular advantages of the generic arrangement of parts, hereinbefore referred to, the construction involves a further material advantage in that it avoids the necessity of any dampening springs which have heretofore been found necessary in connection with telephone transmitters of this general character, the pins $j, j$, which may be nicely adjusted as to contact pressure with the diaphragm, admirably serving the purpose of dampening the diaphragm vibrations as desired.

What I claim is:—

1. A telephone transmitter, comprising a sound receiving diaphragm, a cell containing a granular variable resistance medium supported independently of the diaphragm, and a plurality of connecting devices independent of said granular medium interposed between the diaphragm and the cell and engaging the cell and diaphragm at isolated points on each.

2. A telephone transmitter, comprising a sound receiving diaphragm, a cell containing a granular variable resistance medium supported independently of the diaphragm, and plural pin connections independent of said granular medium interposed between the diaphragm and the cell, said pin connections being located eccentrically of the diaphragm.

3. A telephone transmitter, comprising a sound receiving diaphragm, a cell containing a variable resistance medium, a flexible support for said cell, and pin connections interposed between the cell and the diaphragm, said pin connections being located eccentrically of the diaphragm.

4. A telephone transmitter, comprising a sound receiving diaphragm, a cell containing a variable resistance medium, a flexible support for said cell, a stationary electrode engaging said variable resistance medium, and pin connections interposed between the diaphragm and the variable resistance cell and eccentric to said diaphragm.

5. A telephone transmitter, comprising a sound receiving diaphragm, a cell containing a variable resistance medium, a flexible support for said cell, an adjustable stationary electrode in contact with said variable resistance and serving to hold the flexible support under tension, and pin connections interposed between the diaphragm and the variable resistance cell and eccentric to said diaphragm.

6. A telephone transmitter, comprising a sound receiving diaphragm, a cell containing a variable resistance medium, springs supporting said cell, a bridge piece to which said springs are attached, an adjustable stationary electrode mounted in said bridge piece and engaging said variable resistance medium, an auxiliary diaphragm held between said stationary electrode and said cell, means for holding said electrode in an adjusted position, and pins carried by said cell and engaging the diaphragm at points outside the center thereof.

7. A telephone transmitter, comprising a sound receiving diaphragm, a cell containing a variable resistance medium, a bridge piece for supporting said cell independently of the diaphragm, and means for transmitting the vibrations of said diaphragm to said cell, said means engaging the diaphragm and cell at multiple isolated points on each.

8. A telephone transmitter, comprising a sound receiving diaphragm, a cell containing a variable resistance medium, a bridge piece removably mounted in the transmitter casing, resilient supports for the cell secured to said bridge piece, and means eccentric to the diaphragm for transmitting the vibrations of said diaphragm to the resiliently supported cell.

9. A telephone transmitter, comprising a loose sound receiving diaphragm, a cell containing a variable resistance medium, a bridge piece, springs supporting said cell on said bridge piece, means for transmitting the vibrations of the diaphragm to the cell, said means serving to hold the cell and its supporting springs under tension relative to the diaphragm, a supplemental diaphragm in said cell, an adjustable stationary electrode mounted in said bridge piece and secured to said supplemental diaphragm, and means for holding said electrode in adjusted position.

In testimony whereof I affix my signature, in presence of two witnesses.

CHARLES T. MASON.

Witnesses:
E. M. HALL,
H. R. VAN DEVENTER.